June 8, 1948. J. P. BUTTERFIELD 2,442,838
DRIVE CONSTRUCTION
Filed June 8, 1944 3 Sheets-Sheet 3
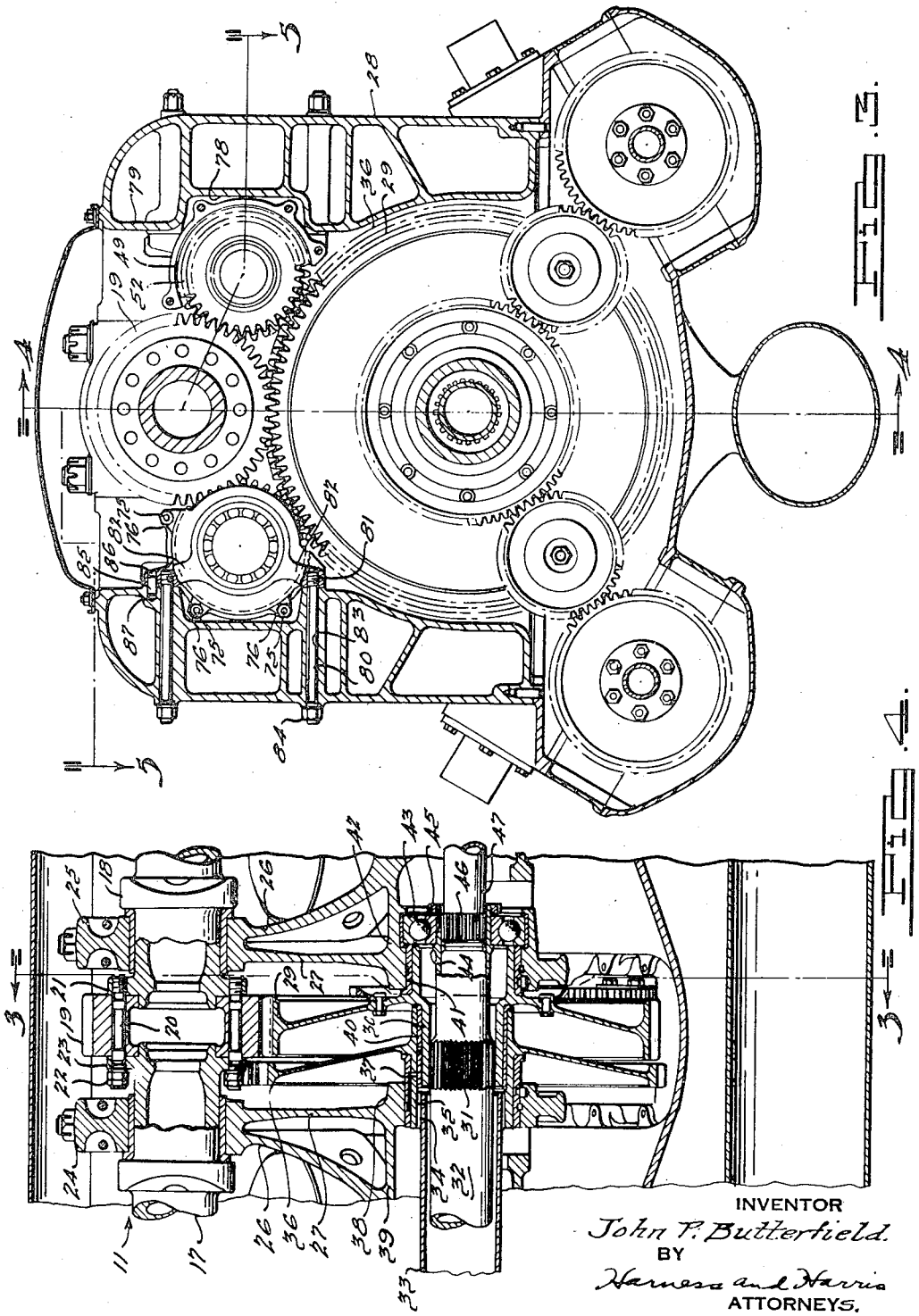
INVENTOR
John P. Butterfield.
BY
Harness and Harris
ATTORNEYS.

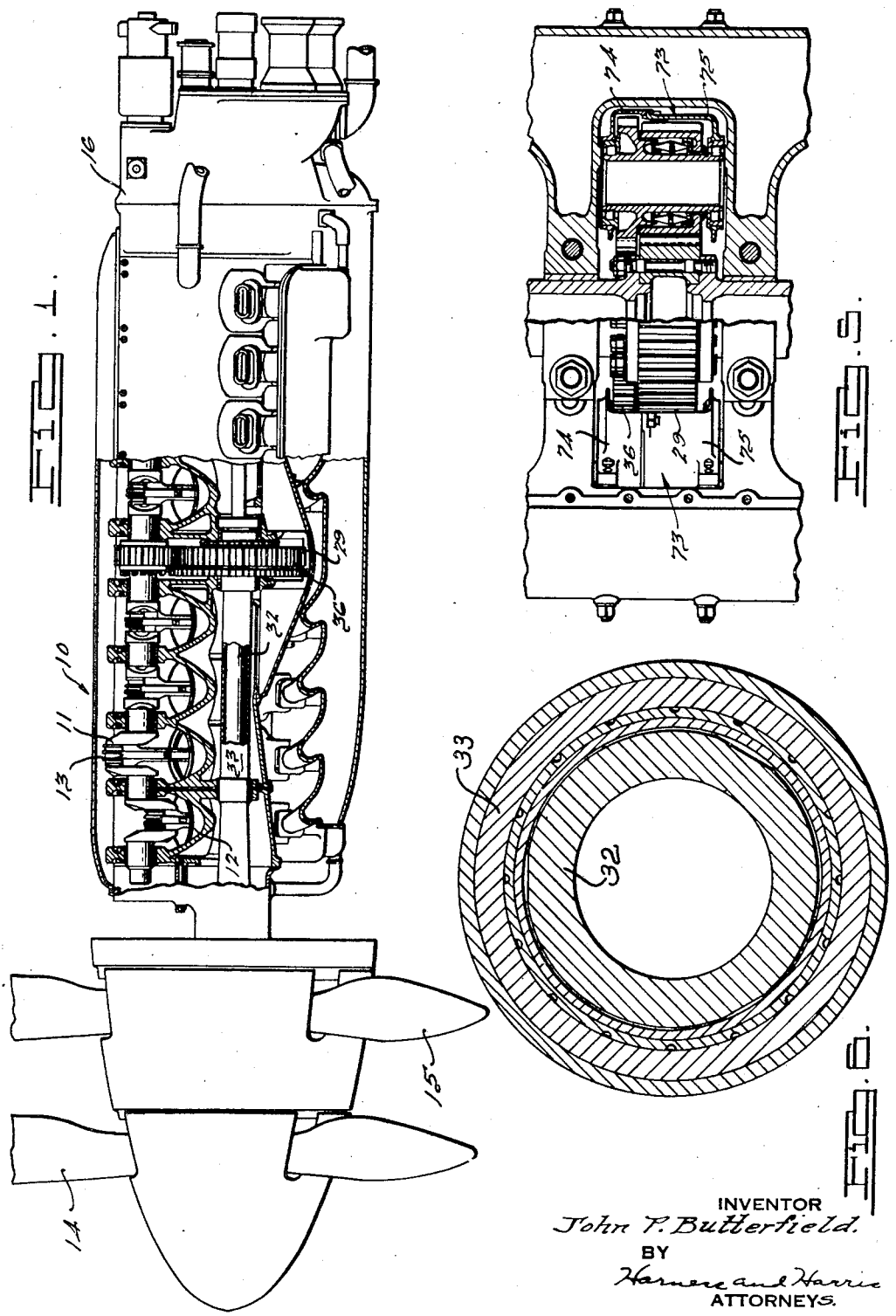

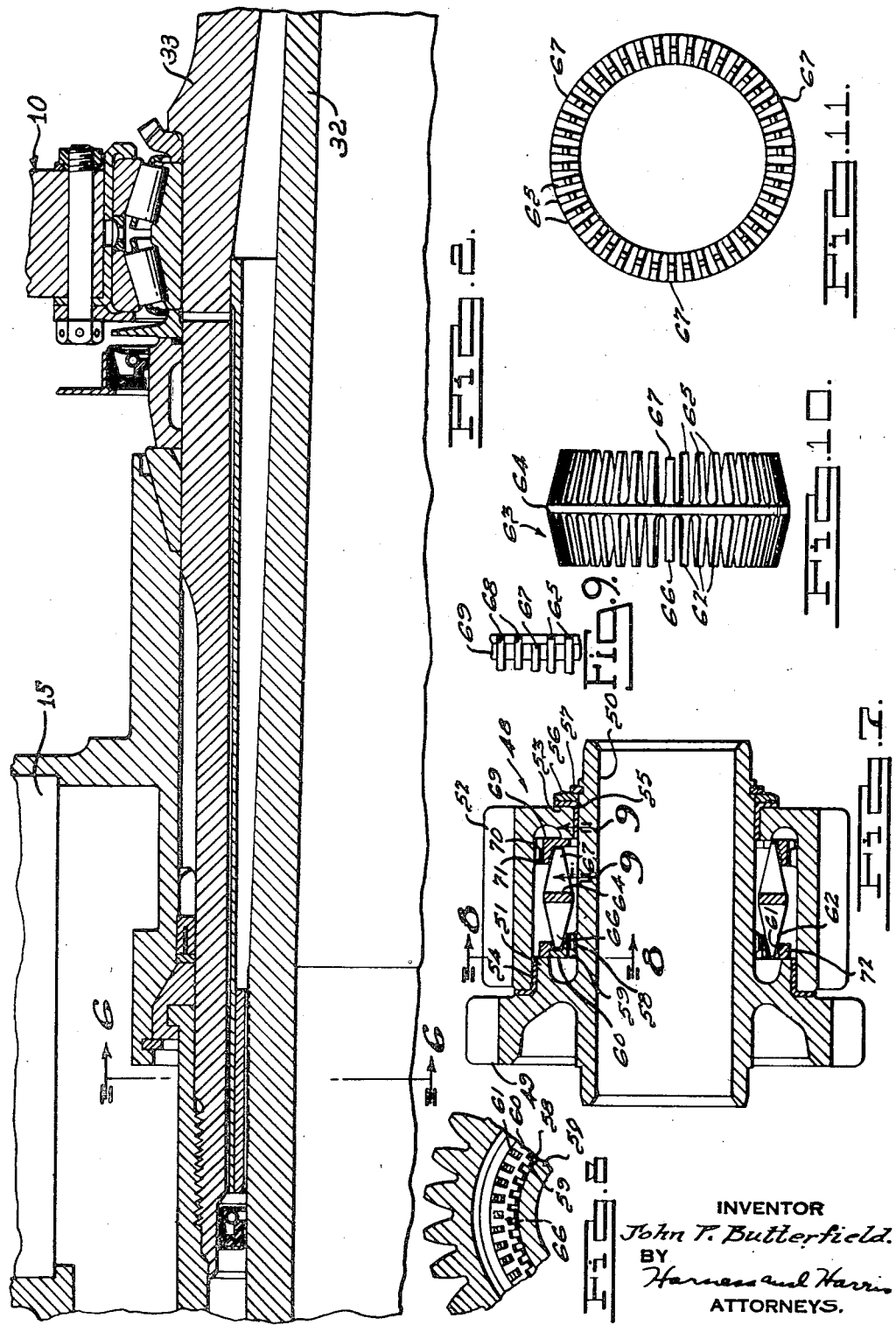

Patented June 8, 1948

2,442,838

UNITED STATES PATENT OFFICE 2,442,838

DRIVE CONSTRUCTION

John P. Butterfield, Highland Park, Mich., assignor to Chrysler Corporation, Highland Park, Mich., a corporation of Delaware Application June 8, 1944, Serial No. 539,282

13 Claims. (Cl. 170—135.5)

This application relates to the separate driving of a plurality of propellers. More specifically it relates to the driving in opposite directions of airplane propellers positioned adjacent one another. The application also relates to a compound flexible gear, which may find use in driving airplane propellers.

It is well known to propel an airplane by means of two propellers positioned near one another and driven in opposite directions. The advantages of this arrangement are well known, and thus only a brief reference to them is required in the present application. It is sufficient to state that oppositely rotating propellers cause gyroscopic forces and torque reactions to be cancelled out. Moreover, the power developed by the blades is absorbed more efficiently for the oppositely rotating propellers tend to prevent the air from leaving the propellers in swirling masses, which indicate an incomplete absorption of power. However, the driving of the propellers in opposite directions presents a considerable problem from the standpoint of minimizing the space and weight required. Obviously, separate drives of some form are required, and they may involve complicated gearing, which will add to weight and space. It is understood, of course, that any saving in weight or space or any rearrangement of parts that will hold to a minimum the strains and reactions upon the parts is of tremendous importance in aircraft.

I propose to drive the oppositely rotating propellers through a pair of telescoping shafts and to position driving parts forming the connection between an engine crankshaft and the telescoping shafts at a mid region of the engine and the crankshaft. In the copending application of Butterfield et al., Serial No. 425,676, filed January 5, 1942, now Patent No. 2,393,141, patented January 15, 1946, there is disclosed and claimed an engine construction for aircraft involving an in-line engine and swinging supports for the engine connected thereto at a mid region. The power take-off gearing connecting the crankshaft and the propeller drive shaft as well as other parts is located at the mid region where the supports are connected. Thus the forces and strains incident to power take-off are transmitted with great advantage directly to the supports.

I have discovered that the telescoping shafts driving the oppositely rotating propellers may be advantageously connected to the mid region of the engine. Moreover, I have invented a novel form and arrangement of parts connecting the engine crankshaft and the telescoping shafts that will keep the parts at a minimum insofar as weight and space is concerned.

An object of the present invention is to provide an improvement in a driving means for oppositely rotating propellers. This novel driving means may be employed to connect the crankshaft of an in-line engine with telescoping shafts that drive the propellers directly.

A further object is to improve a driving shaft and telescoping driven shafts adapted to rotate in opposite directions. The driving connection advantageously involves parts that are compactly arranged and have a minimum of size and weight consistent with efficient operation.

Another object is to position with respect to an engine and its crankshaft driving means connecting the engine crankshaft and a plurality of propellers so that the forces and reactions due to the transmission of drive through the driving means are held to a minimum. This will involve the proper relation of the aforesaid driving means with the engine support.

Still another object is to provide an improved flexible gear. This gear may may be advantageously employed in pairs providing parallel paths for the transmission of drive from a driving element to a driven element so that the one gear of the pair does not take the entire load, but the load is split evenly between the two gears of the pair.

Other objects will appear from the disclosure.

In the drawings:

Fig. 1 is a side view, partially in section, of an airplane engine embodying the novel features of the present invention;

Fig. 2 is a longitudinal sectional view of a portion of the propeller drive;

Fig. 3 is a transverse sectional view taken on the line 3—3 of Fig. 4;

Fig. 4 is a longitudinal sectional view taken on the line 4—4 of Fig. 3;

Fig. 5 is a view partially in section taken on the line 5—5 of Fig. 3;

Fig. 6 is a sectional view taken on the line 6—6 of Fig. 2;

Fig. 7 is a longitudinal sectional view of a novel gear construction;

Fig. 8 is a sectional view taken on the line 8—8 of Fig. 7;

Fig. 9 is a sectional view taken on the line 9—9 of Fig. 7;

Fig. 10 is a side view of an element of the gear construction of Fig. 7; and

Fig. 11 is an end view of the element of Fig. 10.

The reference character 10 designates an in-line engine, which embodies the novel features of the present invention. The engine includes a crankshaft 11 and two V-arranged banks of cylinders, of which only one bank is shown in Fig. 1. Pistons 12 are mounted in the cylinders and are connected with the crankshaft by connecting rods 13 at spaced points along the length thereof so as to deliver power thereto for rotation of the crankshaft. Positioned at one end of the engine 10 is a pair of propellers 14 and 15 adapted to rotate in opposite directions. Each propeller is composed of a plurality of blades, which may conveniently be three in number spaced 120° apart, although for each propeller only two blades are shown. At the opposite end of the engine 10 is positioned a supercharger 16, which is adapted to supply to the engine air or air and fuel in a compressed state.

As seen in Fig. 4, the crankshaft 11 is formed in sections 17 and 18 secured in end-to-end spaced relation at opposite sides of a driving gear 19 by means of screws 20 having threaded engagement at one end with a flange 21 on crankshaft section 18 and nuts 22 threaded on the other end of the screws against the flange 23 formed on the crankshaft sections 17 and 18. The ends of the crankshaft sections 17 and 18 adjacent the driving gear 19 are supported in bearings 24 and 25, respectively. These bearings are integral with webs or walls 26 and 27 forming an integral part of an engine casing 28 (Fig. 3). The driving gear 19 meshes with a wide driven gear 29 having a hub portion 30 keyed to splines 31 on a shaft 32, which forms with a shaft 33 surrounding it a pair of telescoping shafts having the left end drivingly connected to the propellers. The inner shaft 32 is drivingly connected to the propeller 14, and the outer shaft 33 is drivingly connected to the propeller 15. The right end of the shaft 33 is formed with external splines engaging internal splines as indicated by 34 formed on a hub 35 of a narrow driven gear 36, which is slightly larger in diameter than the wide driven gear 29. The hub 35 is journalled externally on a sleeve 37 carried in a support 38 integral with the left-hand web 27 and a web 39 extending from the left-hand web 26. A sleeve 40 between the hubs 30 and 35 journals the driven gears 29 and 36 on one another. The hub 30 of the driven gear 29 is journalled on a sleeve 41 carried in a support 42 integral with the right-hand webs 26 and 27. A ball bearing 43 is also mounted in the support 42 journals the right end of the inner shaft 32, being adapted to take end thrust of the inner shaft. Endwise movement of the inner shaft 33 with respect to the bearing 43 is prevented by a shoulder 44 formed on the shaft and a collar 45 threaded on the very end of the shaft. The right end of the inner shaft 33 receives in a spline connection indicated by 46 the left end of a shaft 47 driving the supercharger 16.

The narrow driven gear 36 is drivingly connected with the driving gear 19 by means of a pair of flexible idler gears 48, shown in detail in Fig. 7. Each gear 48 has a narrow gear section 49 having a long hub 50 and a shoulder 51 outward of the hub and a wide gear section 52 having an inwardly extending flange 53 at one end. One end of the gear section 52 is mounted on an L-shaped ring 54 in turn mounted on the shoulder 51. The flange 53 of the gear section 52 is mounted on an L-shaped ring 55, in turn mounted on the hub 50. The ring 55 is backed by a ring 56 retained against the ring 55 and the flange 53 by a snap ring 57 fitting in a groove in the hub 50. The hub 50 has external splines 58 engaged by internal splines 59 formed on an L-shaped ring 60 having a circular series of openings 61 formed in the outer side of the ring 60. The openings 61 are engaged by a group of fingers 62 of a flexible element 63, illustrated in Figs. 10 and 11, extending generally parallel and in circular arrangement from one side of an annulus 64. A group of fingers 65 extend in the same fashion from the opposite side of the ring 63. As will be seen, each of the fingers is of a uniform thickness and diminishes in width in a direction outward from the annulus 65. All the fingers on one side of the annulus are of generally the same length with the exception of three special fingers 66 spaced 120° apart from one another among the fingers 62, the fingers 66 being slightly shorter and wider at the ends than the fingers 62 are and being adapted to abut certain regions of the ring 60 120° apart where there are no openings 61. Figs. 7 and 8 illustrate the abutment of the ring 60 by a special finger 66, but there is no showing of the 120° spacing of these fingers. However, there is such a showing for three corresponding special fingers 67 positioned among the fingers 65. The fingers 65 fit in a circularly arranged series of openings 68 in an L-shaped ring 68 having external splines 70 engaging internal splines 71 on the gear section 52. The three special fingers 67 abut regions of the ring 69 where there are no openings 68. The purpose of the abutment of the special fingers 66 and 67 with the rings 60 and 69 is to limit the axial movement of the fingers 62 and 65 into the openings 61 and 68 in the rings 60 and 69. A ring 72 surrounds the ring 69, closing the outer ends of the openings 61 and engaging the sides of the ends of the fingers 62 and 66 so as to prevent undesirable tilting of the flexible element 63.

It will be understood that the flexible element 63 with its fingers 62 and 65 and the splined rings 60 and 69 provide a driving connection between the gear sections 49 and 52 that has a certain flexibility permitting a small amount of relative angular movement of the gear sections. The desirability of this will become evident presently. The pair of gears 48 are arranged on opposite sides of an imaginary plane, which may be designated by the section line 4—4, containing the axis of the crankshaft 11 and the axes of the telescoping shafts 32 and 33. The wide gear section 52 of each gear 48 meshes with the driving gear 19, and the narrow gear section 49, with the narrow driven gear 36. By virtue of the fact that the diameters of the gears 29 and 52 are, respectively, smaller than the diameters of the gears 36 and 49, the gears 36 and 49 are in mesh without the gears 29 and 52 being in mesh.

The gears 48 provide two parallel paths for the transmission of drive from the driving gear 19 to the narrow driven gear 36. The flexible construction of the gears 48 permitting relative angular movement of the gear sections prevents one gear 48 from assuming all the load of driving the gear 36 from the gear 19 and assures an even division of this load. The use of two gears 48 is of advantage in that it increases the peripheral width of driving engagement and thus permits the axial width or thickness of the driven gear 36 and the gear sections 49 to be held to a minimum without too great a tooth load. This means that for a given axial width of space to be occupied by the driven gears 29 and 36, the axial width or thickness of gear 29 may be a maximum, this being an advantage in view of the fact that the single engagement of the driving gear 19 with the driven gear 29 provides only a narrow peripheral engagement of these gears, and the load on the inner shaft 32 driven by the wide gear 29 is heavy because of the connection of the supercharger shaft 47 with the shaft 32.

The gears 48 are carried in removable housings 73. As seen in Fig. 5, each housing 73 is formed of a shallow housing part 74 and a deep housing part 75 secured to one another by screws 76 threaded into part 74 and projecting through part 75 and nuts 77 threaded on the projecting ends of the screws. The housing is opened at one side so that the gear sections 49 and 52 may project outwardly therefrom into engagement with the other gears. The housing is removably secured in a recess 78 formed in an inner wall 79 of the crankcase 28 by screws 80 having threaded inner ends 81 engaging openings in bosses 82 formed on the housing. The screws project through openings 83 in the engine casing 28 and have outer threaded ends engaged by nuts. Pins 85 fitting on openings 86 and 87 in the housing and the engine casing locate the housing so that the screws 80 may be applied.

It is claimed:

1. In an assembly comprising an in-line engine having a crankshaft and a plurality of pistons for delivering power to the crankshaft at a plurality of points spaced lengthwise of the crankshaft, a pair of oppositely rotating propellers, and a pair of telescoping shafts for driving the propellers, the combination therewith of means for driving the telescoping shafts from the crankshaft comprising a driving gear mounted on the crankshaft at a midpoint in the length thereof between points of delivery of power by the pistons, a wide driven gear mounted on one of the telescoping shafts and meshing with the driving gear, a narrow driven gear mounted on the other of the telescoping shafts, and a pair of intermediate gears establishing drive between the driving gear and the narrow driven gear, one intermediate gear being positioned to one side of a plane containing the axes of the crankshaft and telescoping shafts and the other intermediate gear being positioned to the other side of the said plane.

2. In an assembly comprising an in-line engine having a crankshaft and a plurality of pistons for delivering power to the crankshaft at a plurality of points spaced lengthwise of the crankshaft, a pair of oppositely rotating propellers, and a pair of telescoping shafts for driving the propellers, the combination therewith of means for driving the telescoping shafts from the crankshaft comprising a driving gear mounted on the crankshaft at a midpoint in the length thereof between points of delivery of power by the pistons, a wide driven gear mounted on the inner of the telescoping shafts and meshing with the driving gear, a narrow driven gear mounted on the outer of the telescoping shafts, and a pair of idler gears establishing drive between the driving gear and the narrow driven gear, one idler gear being positioned to one side of a plane containing the axes of the crankshaft and the telescoping shafts and the other idler gear being positioned to the other side of the said plane.

3. In an assembly comprising an in-line engine having a crankshaft and a plurality of pistons for delivering power to the crankshaft at a plurality of points spaced lengthwise of the crankshaft, a pair of oppositely rotating propellers, and a pair of telescoping shafts for driving the propellers, the combination therewith of means for driving the telescoping shafts from the crankshaft comprising a driving gear mounted on the crankshaft at a midpoint in the length thereof between points of delivery of power by the pistons, a first driven gear mounted on one of the telescoping shafts and meshing with the driving gear, a second driven gear mounted on the other of the telescoping shafts, and a pair of intermediate gears establishing drive between the driving gear and the second driven gear, one intermediate gear being positioned to one side of a plane containing the axes of the crankshaft and the telescoping shafts and the other intermediate gear being positioned to the other side of the said plane, each intermediate gear being formed of a first section meshing with the driving gear, a second section meshing with the second driven gear, and torsionally resilient means connecting the sections for equalizing the driving load assumed by the intermediate gears.

4. In an assembly comprising an in-line engine having a crankshaft and a plurality of pistons for delivering power to the crankshaft at a plurality of points spaced lengthwise of the crankshaft, a pair of oppositely rotating propellers, and a pair of telescoping shafts for driving the propellers, the combination therewith of means for driving the telescoping shafts from the crankshaft comprising a driving gear mounted on the crankshaft at a midpoint in the length thereof between points of delivery of power by the pistons, a first driven gear mounted on the inner of the telescoping shafts and meshing with the driving gear, a second driving gear mounted on the outer of the telescoping shafts, and a pair of intermediate gears establishing drive between the driving gear and the second driven gear, one intermediate gear being positioned to one side of a plane containing the axes of the crankshaft and the telescoping shafts and the other intermediate gear being positioned to the other side of the said plane, each intermediate gear being formed of a first section meshing with the driving gear, a second section meshing with the second driven gear, and torsionally resilient means connecting the sections for equalizing the driving load assumed by the intermediate gears.

5. In an assembly comprising an in-line engine having a crankshaft and a plurality of pistons for delivering power to the crankshaft at a plurality of points spaced length-wise of the crankshaft, a pair of oppositely rotating propellers, and a pair of telescoping shafts for driving the propellers, the combination therewith of means for driving the telescoping shafts from the crankshaft comprising a driving gear mounted on the crankshaft at a midpoint in the length thereof between points of delivery of power by the pistons, a wide driven gear mounted on one of the telescoping shafts and meshing with the driving gear, a narrow driven gear mounted on the other of the telescoping shafts, and a pair of intermediate gears establishing drive between the driving gear and the narrow driven gear, one intermediate gear being positioned to one side of a plane containing the axes of the crankshaft and the telescoping shafts and the other intermediate gear being positioned to the other side of the said plane, each intermediate gear being formed of a first section meshing with the driving gear, a second section meshing with the second driven gear, and torsionally resilient means connecting the sections for equalizing the driving load assumed by the intermediate gears.

6. In an assembly comprising an in-line engine having a crankshaft and a pularlity of pistons for delivering power to the crankshaft at a plurality of points spaced length-wise of the crankshaft, a pair of oppositely rotating propellers, and a pair of telescoping shafts for driving the propellers, the combination therewith of means for driving the telescoping shafts from the crankshaft comprising a driving gear mounted on the crankshaft at a midpoint in the length thereof between points of delivery of power by the pistons, a wide driven gear mounted on the inner of the telescoping shafts and meshing with the driving gear, a narrow driven gear mounted on the outer of the telescoping shafts, and a pair of intermediate gears establishing drive between the driving gear and the narrow driven gear, one intermediate gear being positioned to one side of a plane containing the axes of the crankshaft and the telescoping shafts and the other intermediate gear being positioned to the other side of the said plane, each intermediate gear being formed of a first section meshing with the driving gear, a second section meshing with the narrow driven gear, and torsionally resilient means connecting the sections for equalizing the driving load assumed by the intermediate gears.

7. In an assembly comprising an in-line engine having a crankshaft and a plurality of pistons for delivering power to the crankshaft at a plurality of points spaced length-wise of the crankshaft, a pair of oppositely rotating propellers, and a pair of telescoping shafts for driving the propellers, the combination therewith of means for driving the telescoping shafts from the crankshaft comprising a driving gear mounted on the crankshaft at a midpoint in the length thereof between points of delivery of power by the pistons, a first driven gear mounted on one of the telescoping shafts and meshing with the driving gear, a second driven gear mounted on the other of the telescoping shafts, and a pair of intermediate gears establishing drive between the driving gear and the second driven gear, one intermediate gear being positioned to one side of a plane containing the axes of the crankshaft and the telescoping shafts and the other intermediate gear being positioned to the other side of the said plane, each intermediate gear being formed of a first section meshing with the driving gear, a second section meshing with the second driven gear, and torsionally resilient means connecting the sections for equalizing the driving load assumed by the intermediate gears, said torsionally resilient means comprising a first ring secured to the first section and having a plurality of circularly spaced openings, a second ring secured to the second section and having a plurality of circularly spaced openings, and an element formed of an annular portion, a first set of circularly spaced fingers extending axially from one side of the annulus into engagement with the openings on the first ring, and a second set of circularly spaced fingers extending axially from the other side of the annulus into engagement with the openings in the second ring.

8. A flexible compound gear comprising a first gear section, a second gear section, a first ring keyed to the first gear section and having a plurality of openings, a second ring keyed to the second gear section and having a plurality of openings, and a member comprising an annulus, a first set of teeth extending axially from one side of the annulus into engagement with the openings in the first ring, and a second set of teeth extending axially from the other side of the annulus into engagement with the openings in the second ring.

9. The gear of claim 8, the first ring being keyed internally to the first gear section, and the second ring being keyed externally to the second gear section.

10. The gear of claim 8, certain of the teeth of each set being shorter than the remainder and being adapted to abut the rings for preventing the remainder of the teeth from penetrating the openings in the rings too far.

11. A flexible compound gear comprising a first gear section, a second gear section, and flexible connecting means keyed externally to the first gear section and internally to the second gear section.

12. A flexible compound gear comprising a first gear section having a long hub and a shoulder spaced outwardly of the hub, a second gear section having at one end an inwardly extending flange journalled on the hub and being journalled at the other end upon the shoulder, and means flexibly connecting the gear sections.

13. A gear as specified in claim 12, the last mentioned means comprising a first ring keyed internally to the first gear section, a second ring keyed exteriorily to the second gear section, and a flexible element including an annulus and fingers engaging the rings.

JOHN P. BUTTERFIELD.

REFERENCES CITED

The following references are of record in the file of this patent:

UNITED STATES PATENTS

| Number | Name | Date |
|---|---|---|
| 1,151,762 | Day | Aug. 31, 1915 |
| 1,318,209 | Jouffret | Oct. 7, 1919 |
| 1,553,854 | Fornaca | Sept. 15, 1925 |
| 1,634,017 | Cappa | June 28, 1927 |
| 1,814,802 | Herr | July 14, 1931 |
| 1,858,911 | Zerbi | May 17, 1932 |
| 2,011,855 | Gilman | Aug. 20, 1935 |
| 2,165,453 | Chilton et al. | July 11, 1939 |
| 2,185,545 | Egan | Jan. 2, 1940 |
| 2,201,893 | Gadoux et al. | May 21, 1940 |
| 2,216,013 | Kenny | Sept. 24, 1940 |
| 2,347,906 | Hatcher | May 2, 1944 |
| 2,404,865 | Semar | July 30, 1946 |

FOREIGN PATENTS

| Number | Country | Date |
|---|---|---|
| 472,318 | Great Britain | Sept. 18, 1937 |
| 541,820 | Great Britain | Dec. 12, 1941 |
| 831,325 | France | June 7, 1938 |

OTHER REFERENCES

Serial No. 330,322, Nallinger (A. P. C.) pub. May 18, 1943.